United States Patent
Lin et al.

(10) Patent No.: US 11,785,376 B2
(45) Date of Patent: Oct. 10, 2023

(54) RECEIVER CONTROL METHOD AND TERMINAL

(71) Applicant: VIVO MOBILE COMMUNICATION CO., LTD., Guangdong (CN)

(72) Inventors: Hanzhong Lin, Guangdong (CN); Junhui Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 134 days.

(21) Appl. No.: 17/511,414

(22) Filed: Oct. 26, 2021

(65) Prior Publication Data
US 2022/0053263 A1    Feb. 17, 2022

Related U.S. Application Data

(63) Continuation of application No. PCT/CN2020/084649, filed on Apr. 14, 2020.

(30) Foreign Application Priority Data

Apr. 28, 2019 (CN) .......................... 201910350552.8

(51) Int. Cl.
*H04R 1/34* (2006.01)
*G06F 3/16* (2006.01)
(Continued)

(52) U.S. Cl.
CPC ............. *H04R 1/345* (2013.01); *G06F 3/165* (2013.01); *H04M 1/19* (2013.01); *H04R 3/00* (2013.01);
(Continued)

(58) Field of Classification Search
CPC .................................. H04R 1/345; H04R 1/34
See application file for complete search history.

(56) References Cited

U.S. PATENT DOCUMENTS 9,183,845 B1 * 11/2015 Gopalakrishnan ..........................
G10L 21/0208
11,540,046 B2 * 12/2022 Song ..................... H04M 1/605
(Continued)

FOREIGN PATENT DOCUMENTS

CN    201114244 Y    9/2008
CN    201156760 Y    11/2008
(Continued)

OTHER PUBLICATIONS

International Search Report of International Application No. PCT/CN2020/084649 dated Jul. 16, 2020.
(Continued)

*Primary Examiner* — Olisa Anwah
(74) *Attorney, Agent, or Firm* — IP & T GROUP LLP (57) ABSTRACT

A receiver control method includes: when a receiver of a terminal is at a first position of the terminal, picking up, by using a microphone, an audio signal sent by the receiver; and if there is a noise in the audio signal picked up by the microphone, moving the receiver to a second position of the terminal. When the receiver is at the first position, an orthographic projection of a first sound hole of the receiver along a first direction at least partially overlaps with a target component. When the receiver is at the second location, the orthographic projection of the first sound hole along the first direction does not overlap with the target component.

9 Claims, 3 Drawing Sheets

(51) Int. Cl.
*H04M 1/19* (2006.01)
*H04R 3/00* (2006.01)
*H04R 29/00* (2006.01)

(52) U.S. Cl.
CPC ........ *H04R 29/001* (2013.01); *H04R 2499/11* (2013.01)

(56) References Cited

U.S. PATENT DOCUMENTS

| | | | | |
|---|---|---|---|---|
| 2007/0298827 | A1* | 12/2007 | Hansson | H04M 1/03 455/550.1 |
| 2008/0227407 | A1* | 9/2008 | Erb | H04M 19/04 455/77 |
| 2011/0040962 | A1* | 2/2011 | Peyre | H04M 1/605 713/100 |
| 2014/0004913 | A1* | 1/2014 | Kimura | H04B 1/3833 455/575.1 |
| 2014/0329567 | A1* | 11/2014 | Chan | H04M 1/605 455/569.1 |
| 2015/0350759 | A1 | 12/2015 | Shin | |
| 2016/0249123 | A1* | 8/2016 | Lee | H04R 1/086 |
| 2019/0253533 | A1* | 8/2019 | Fan | H04M 1/0206 |

FOREIGN PATENT DOCUMENTS

| | | |
|---|---|---|
| CN | 201550161 U | 8/2010 |
| CN | 108200244 A | 6/2018 |
| CN | 207926663 U | 9/2018 |
| CN | 108712563 A | 10/2018 |
| CN | 110012143 A | 7/2019 |
| JP | 2001285428 A * | 10/2001 |

OTHER PUBLICATIONS

Written Opinion of The International Searching Authority of International Application No. PCT/CN2020/084649 dated Jul. 16, 2020.
First Office Action of Priority Application No. 201910350552.8 dated May 7, 2020.

* cited by examiner

RECEIVER CONTROL METHOD AND TERMINAL

CROSS-REFERENCE TO RELATED APPLICATIONS

This application is a Bypass Continuation Application of PCT/CN2020/084649 filed on Apr. 14, 2020, which claims priority to Chinese Patent Application No. 201910350552.8 filed on Apr. 28, 2019, which are incorporated herein by reference in their entirety.

TECHNICAL FIELD

The present disclosure relates to the field of communications technologies, and in particular, to a receiver control method and a terminal.

BACKGROUND

With development of mobile phone technologies, mobile phones with a full vision display/waterdrop notch display/dual screen display appear in the market. For an optimal look, sound output of a receiver tends to be designed with a micro slit or narrow slit gradually. Some mobile phones have a slider to hide a receiver sound hole under a screen, and the screen is slid off manually when a call is answered. Some mobile phones are provided with two receiver sound holes, and when a screen is not slid off or a receiver does not pop out, an audio signal sent by the receiver needs to go through the two sound holes. When a screen is not slid off or a receiver does not pop out, there is a specific gap between the receiver and another component of a terminal and a difference between sizes of gaps in different terminals. Due to the gap and different sizes of gaps, the foregoing designs of the receiver definitely cause problems such as noises, a poor sound quality, or a too low volume in audio played by a terminal.

SUMMARY

According to a first aspect, an embodiment of the present disclosure provides a receiver control method, including:
when a receiver of the terminal is at a first position of the terminal, an audio signal sent by the receiver is picked up by using a microphone, where when the receiver is at the first position, an orthographic projection of a first sound hole of the receiver along a first direction at least partially overlaps with a target component; and
if there is a noise in the audio signal picked up by the microphone, the receiver is moved to a second position of the terminal, where when the receiver is at the second position, the orthographic projection of the first sound hole along the first direction does not overlap with the target component.

According to a second aspect, an embodiment of the present disclosure provides a terminal, including:
a first obtaining module configured to pick up, by using a microphone, an audio signal sent by the receiver when a receiver of the terminal is at a first position of the terminal, where when the receiver is at the first position, an orthographic projection of a first sound hole of the receiver along a first direction at least partially overlaps with a target component; and
a first control module configured to move the receiver to a second position of the terminal if there is a noise in the audio signal picked up by the microphone, where when the receiver is at the second position, the orthographic projection of the first sound hole along the first direction does not overlap with the target component.

According to a third aspect, an embodiment of the present disclosure further provides a terminal, including a processor, a memory, and a computer program stored in the memory and executable on the processor. When the computer program is executed by the processor, the steps of the receiver control method described above are implemented.

According to a fourth aspect, an embodiment of the present disclosure further provides a non-transitory computer-readable storage medium. The non-transitory computer-readable storage medium stores a computer program, and when the computer program is executed by a processor, the steps of the receiver control method described above are implemented.

DESCRIPTION OF THE DRAWINGS

To describe the technical solutions in embodiments of the present disclosure more clearly, the following briefly describes the accompanying drawings for describing the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The technical solutions in embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
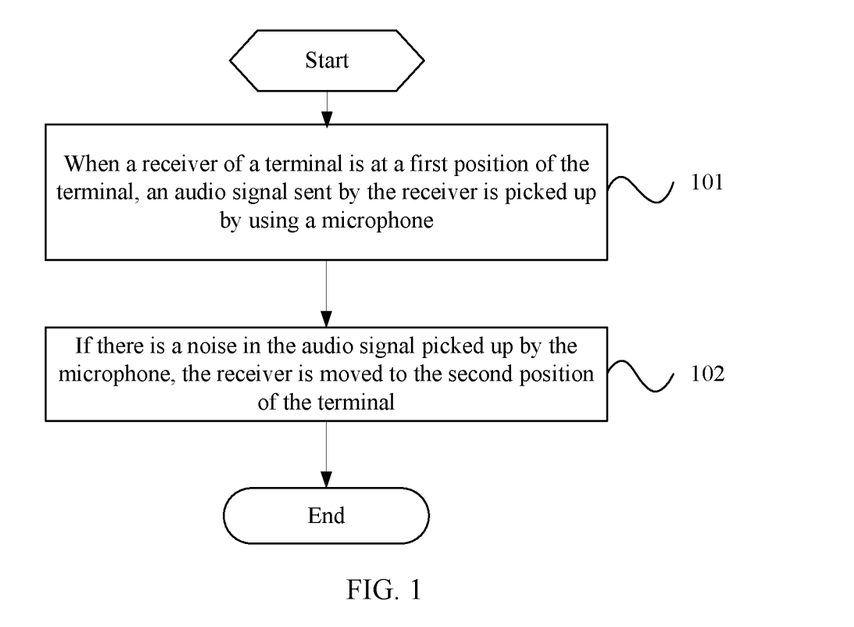
FIG. 1 is a first schematic flowchart of a receiver control method according to an embodiment of the present disclosure.

As shown in FIG. 1, a receiver control method in an embodiment of the present disclosure includes:

Step 101: When a receiver of the terminal is at a first position of the terminal, an audio signal sent by the receiver is picked up by using a microphone, where when the receiver is at the first position, an orthographic projection of a first sound hole of the receiver along a first direction at least partially overlaps with a target component.

Figure 2:
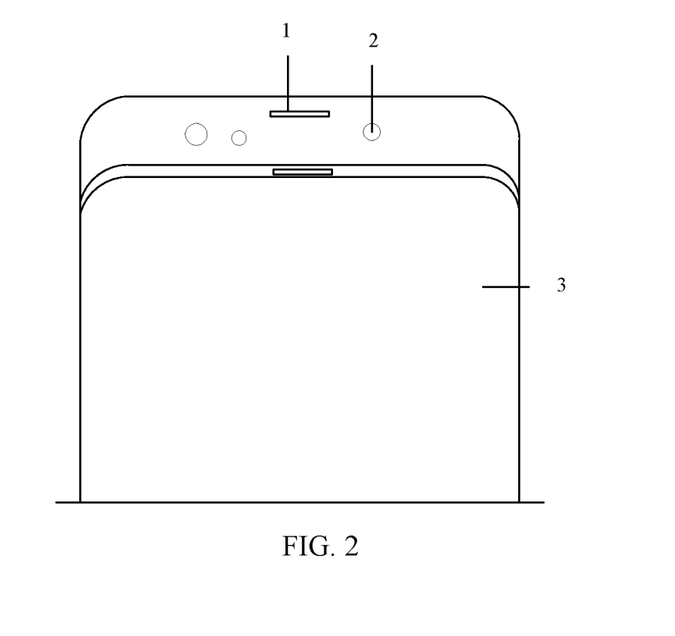
FIG. 2 is a schematic diagram of a configured position of a receiver.

The method in this embodiment of the present invention can be applied to a terminal in which a receiver can slide relative to a display screen of the terminal. As shown in FIG. 2, in the terminal, a receiver 1 and a camera lens 2 are disposed in a same module, where the module may slide, driven by an electrical machinery, relative to a display screen 3 of the terminal, or a position of the module including the receiver 1 relative to the display screen 3 may be changed by sliding the display screen 3 of the terminal. Through relative sliding between a module including a receiver and a display screen, a position of the module including the receiver relative to the display screen includes two cases, where first, the receiver is beyond a coverage of the display screen, that is, a first sound hole of the receiver is exposed out in the air, and the display screen has a relatively little influence on an audio signal from the first sound hole of the receiver; and second, the relative position is that the receiver is within the coverage of the display screen, that is, the first sound hole of the receiver is covered by the display screen, and the display screen may have an influence on the audio signal from the first sound hole.

Optionally, the first direction is a sound output direction of the first sound hole; and the first position of the terminal at which the receiver is located may be a position when the receiver has not slid and been exposed on the terminal. In this case, the receiver is covered by a display screen of the terminal, and the orthographic projection of the first sound hole of the receiver along the first direction partly overlaps with the target component of the terminal.

For example, in this embodiment of the present disclosure, a pickup configured to pick up a sound may be disposed next to a sound hole of the receiver. A microphone is used as an example. The microphone and the receiver are separated inside by using a component, that is, the sound hole of the receiver is not shared. When a user is having a call, the microphone picks up an audio signal from the sound hole of the receiver in real time.

Step 102: If there is a noise in the audio signal picked up by the microphone, the receiver is moved to a second position of the terminal, where when the receiver is at the second position, the orthographic projection of the first sound hole along the first direction does not overlap with the target component.

When a noise is detected in the audio signal picked up by the microphone, optionally, an electrical machinery system of the terminal is controlled, to control and move the receiver to the second position of the terminal. Optionally, that the receiver is at the second position means that the receiver has slid to a position and been exposed on the terminal. In this case, the first sound hole of the receiver is not covered by the display screen of the terminal, that is, is exposed out in the air, and the orthographic projection of the first sound hole of the receiver along the first direction does not overlap with the target component of the terminal. The target component has a relatively little influence on transmission of the audio signal, thereby preventing problems such as noises, a poor sound quality, or a too low volume of the audio signal due to a gap between the first sound hole of the receiver and the target component.

In this embodiment, when the receiver is at the first position of the terminal, if a noise is detected in the audio signal picked up by the microphone, the receiver is controlled to be moved to the second position of the terminal. At the second position, the target component has a relatively little influence on transmission of the audio signal, thereby effectively preventing problems such as noises, a poor sound quality, or a too low volume of the audio signal due to a gap between the receiver and the target component of the terminal and effectively improving the sound quality.

Optionally, the target component is a second sound hole of the receiver. Optionally, the second sound hole is disposed on the top of the display screen of the terminal. When the receiver is at the first position of the terminal, the orthographic projection of the first sound hole of the receiver along the first direction at least partially overlaps with the second sound hole, and there is a gap between the first sound hole and the second sound hole. In this case, the audio signal sent by the receiver passes through the first sound hole, and then needs to pass through the second sound hole as well, and the gap between the second sound hole and the first sound hole may cause a noise in the audio signal.

If a noise is detected in the audio signal sent by the receiver in this case, the receiver is moved to the second position of the terminal. When the receiver is at the second position of the terminal, the orthographic projection of the first sound hole of the receiver along the first direction does not overlap with the second sound hole, that is, the first sound hole is exposed out in the air. In this case, the audio signal sent by the receiver passes through the first sound hole, and does not need to pass through the second sound hole, thereby preventing problems such as noises, a poor sound quality, or a too low volume of the audio signal due to a gap between the first sound hole and the second sound hole that are of the receiver.

For example, in some possible embodiments of the present disclosure, after the step of picking up the audio signal sent by the receiver by using the microphone, the method further includes:

A relationship between a signal frequency and a signal amplitude of the audio signal is analyzed, to determine whether there is a noise in the audio signal picked up by the microphone.

Optionally, the microphone transmits the picked up audio signal to a digital signal processor (DSP), and the DSP converts an analog signal to a digital signal, and analyzes the relationship between the signal frequency and the signal amplitude of the audio signal, to determine, based on whether high harmonics with a relatively large amplitude are included in a frequency spectrum of the audio signal, whether there is a noise in the audio signal picked up by the microphone.

Because everybody has a different component of sound frequency, and there is a gap between the first sound hole of the receiver and the target component, the gap causes a different level of noises in everybody's sound. Due to the gap, a noise may appear in somebody's component of sound frequency, but no noise in some other's component of sound frequency. An audio signal with a noise has a plurality of high-harmonic components. The terminal analyzes whether high harmonics with a relatively large amplitude are included in a frequency spectrum of the audio signal, and if the high harmonics with a relatively large amplitude are included in the frequency spectrum of the audio signal, the audio signal picked up by the microphone is considered to have a noise. When a noise is detected in the audio signal sent by the receiver, the receiver is controlled to be moved to the second position of the terminal.

Figure 3:
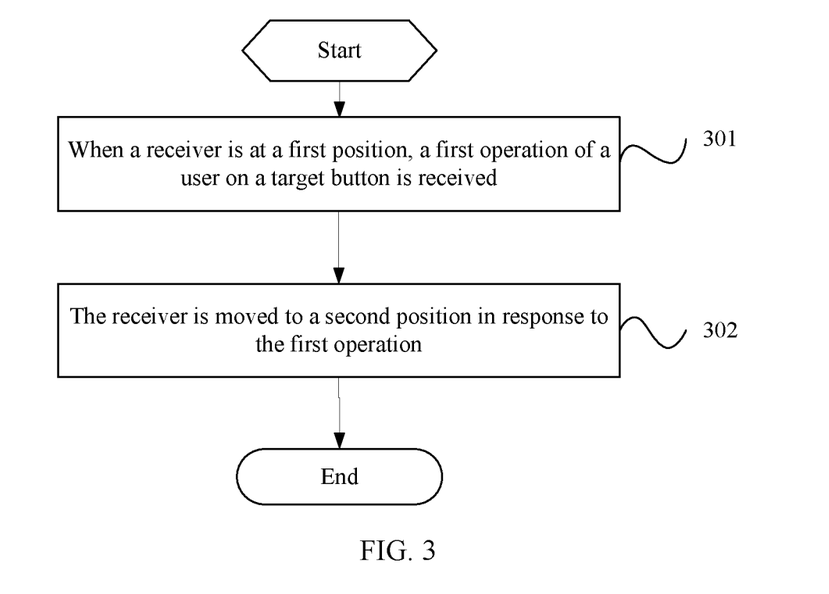
FIG. 3 is a second schematic flowchart of a receiver control method according to an embodiment of the present disclosure.

Optionally, as shown in FIG. 3, the method further includes:

Step 301: When the receiver is at the first position, a first operation of a user on a target button is received.

The first operation includes any one of the following: an operation in which the user presses the target button to preset duration; an operation in which the user continuously presses the target button to preset a quantity of times; and an operation in which the user presses the target button when the terminal is at a full volume.

In this embodiment, that the receiver is at the first position may be that the receiver has not slid and been exposed on the terminal. If the user, when calling, subjectively feels that there is a noise in an audio signal passed into the ears, the target button on the terminal may be operated to send an indication about the noise in the audio signal to the terminal. The target button may be a button that already exists on the terminal, for example, a volume button. When the user feels a noise, the target button may be pressed to preset duration, or the target button may be pressed successively to preset a quantity of times; or when a volume of the terminal is already a full volume, the user still feels that a call volume is low and there is a noise, the target button may be pressed, and the terminal receives the foregoing operation of the user on the target button.

It should be noted that, the operation of the user on the target button includes but is not limited to the foregoing forms, and the target button of the terminal and forms of operations on the target button may be configured based on requirements.

Step 302: The receiver is moved to the second position in response to the first operation.

After the terminal receives the first operation of the user on the target button, the receiver is controlled to be moved to the second position of the terminal. When the receiver is at the second position, the orthographic projection of the first sound hole along the first direction does not overlap with the target component. In this case, the audio signal sent by the receiver passes through the first sound hole, and the target component has a relatively little influence on transmission of the audio signal, thereby preventing problems such as noises, a poor sound quality, or a too low volume of the audio signal due to a gap between the first sound hole of the receiver and the target component.

In this embodiment of the present disclosure, when the receiver is at the first position of the terminal, if a noise is detected in the audio signal picked up by the microphone, the receiver is controlled to be moved to the second position of the terminal. At the second position, the target component has a relatively little influence on transmission of the audio signal, thereby effectively preventing problems such as noises, a poor sound quality, or a too low volume of the audio signal due to a gap between the receiver and the target component and effectively improving the sound quality.

Figure 4:
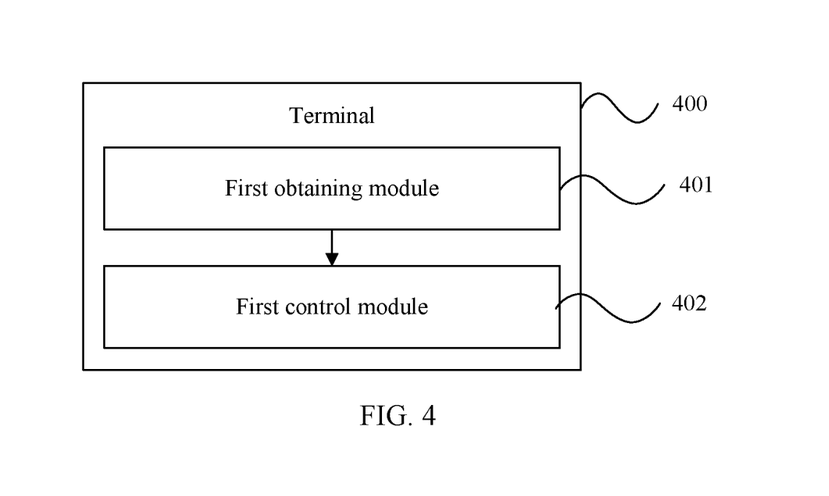
FIG. 4 is a structural block diagram of a terminal according to an embodiment of the present disclosure.

FIG. 4 is a block diagram of a terminal according to an embodiment of the present disclosure. The terminal 400 shown in FIG. 4 includes a first obtaining module 401 and a first control module 402.

The first obtaining module 401 is configured to pick up, by using a microphone, an audio signal sent by the receiver when a receiver of the terminal is at a first position of the terminal, where when the receiver is at the first position, an orthographic projection of a first sound hole of the receiver along a first direction at least partially overlaps with a target component.

The first control module 402 is configured to move the receiver to a second position of the terminal if there is a noise in the audio signal picked up by the microphone, where when the receiver is at the second position, the orthographic projection of the first sound hole along the first direction does not overlap with the target component.

On the basis of FIG. 4, optionally, the target component is a second sound hole of the receiver.

Optionally, the terminal further includes:

An analysis module configured to analyze a relationship between a signal frequency and a signal amplitude of the audio signal, to determine whether there is a noise in the audio signal picked up by the microphone.

Optionally, the terminal 400 further includes:
a receiving module configured to receive a first operation of a user on a target button when the receiver is at the first position; and
a second control module configured to move the receiver to the second position in response to the first operation, where
the first operation includes any one of the following:
an operation in which the user presses the target button to preset duration;
an operation in which the user continuously presses the target button to preset a quantity of times; and
an operation in which the user presses the target button when the terminal is at a full volume.

The terminal 400 can implement the processes implemented by the terminal in the method embodiments of FIG. 1 to FIG. 3. To avoid repetition, details are not described herein again. In this embodiment of the present disclosure, when the receiver is at the first position of the terminal, if a noise is detected in the audio signal picked up by the microphone, the receiver is controlled to be moved to the second position of the terminal. At the second position, the target component has a relatively little influence on transmission of the audio signal, thereby effectively preventing problems such as noises, a poor sound quality, or a too low volume of the audio signal due to a gap between the receiver and the target component and effectively improving the sound quality.

Figure 5:
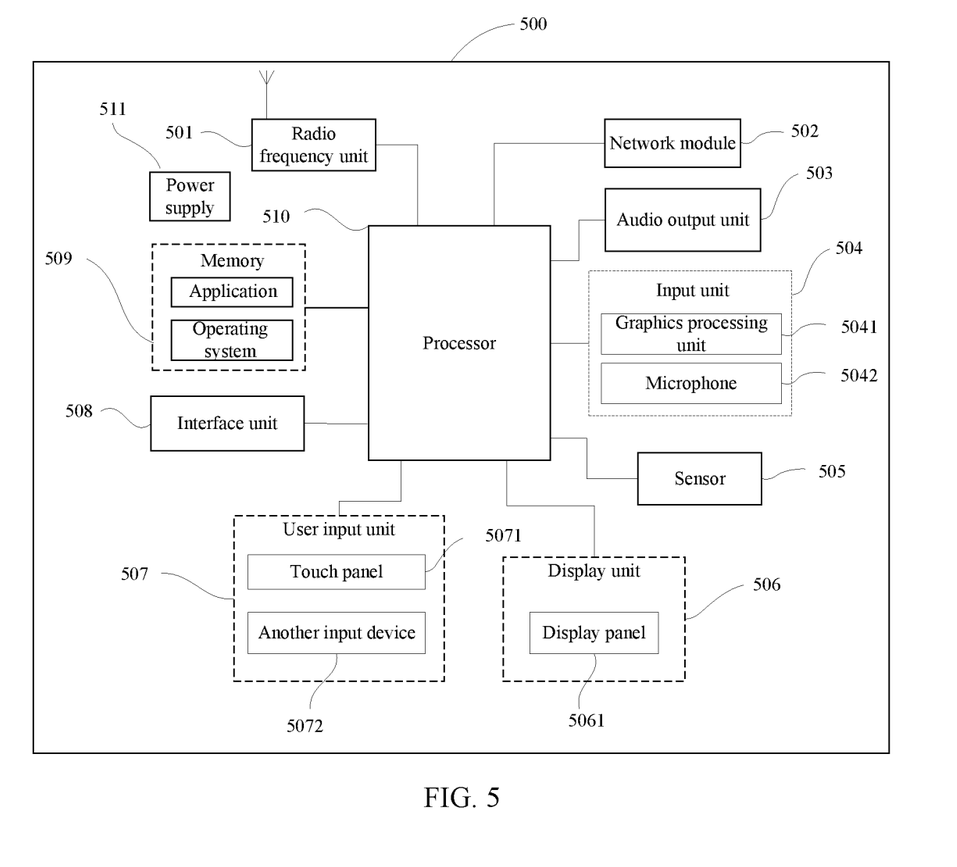
FIG. 5 is a schematic diagram of a hardware structure of a terminal according to an embodiment of the present disclosure.

FIG. 5 is a schematic diagram of a hardware structure of a terminal according to the embodiments of the present disclosure. The terminal 500 includes but is not limited to: a radio frequency unit 501, a network module 502, an audio output unit 503, an input unit 504, a sensor 505, a display unit 506, a user input unit 507, an interface unit 508, a memory 509, a processor 510, a power supply 511, and other components. A person skilled in the art may understand that the structure of the terminal shown in FIG. 5 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The input unit 504 is configured to pick up, by using a microphone, an audio signal sent by the receiver when a receiver of the terminal is at a first position of the terminal, where when the receiver is at the first position, an orthographic projection of a first sound hole of the receiver along a first direction at least partially overlaps with a target component.

The processor 510 is configured to move the receiver to a second position of the terminal, where when the receiver is at the second position if there is a noise in the audio signal picked up by the microphone, the orthographic projection of the first sound hole along the first direction does not overlap with the target component.

It can be learned that, when the receiver is at the first position of the terminal, if a noise is detected by the terminal in the audio signal picked up by the microphone, the receiver is controlled to be moved to the second position of the terminal. The target component has a relatively little influence on transmission of the audio signal, thereby effectively preventing problems such as noises, a poor sound quality, or a too low volume of the audio signal due to a gap between the receiver and the target component and effectively improving the sound quality.

It should be understood that, in this embodiment of the present disclosure, the radio frequency unit 501 may be configured to receive and send information or a signal during a call. For example, after receiving downlink data from a base station, the radio frequency unit 501 sends the downlink data to the processor 510 for processing; and sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communication system.

The terminal provides wireless broadband Internet access for a user by using the network module 502, for example, helps the user to send and receive an e-mail, browse a web page, and access streaming media.

The audio output unit 503 may convert audio data received by the radio frequency unit 501 or the network module 502 or stored in the memory 509 to an audio signal and output as a sound. In addition, the audio output unit 503 may further provide audio output (for example, a call signal receiving sound or a message receiving sound) related to a specific function performed by the terminal 500. The audio output unit 503 includes a loudspeaker, a buzzer, a receiver, and the like.

The input unit 504 is configured to receive an audio signal or a video signal. The input unit 504 may include a graphics processing unit (GPU) 5041 and a microphone 5042. The graphics processing unit 5041 processes image data of a still picture or a video obtained by an image capture apparatus (for example, a camera) in a video capture mode or an image capture mode. A processed image frame can be displayed on the display unit 506. The image frame processed by the graphics processing unit 5041 may be stored in the memory 509 (or another storage medium) or sent by using the radio frequency unit 501 or the network module 502. The microphone 5042 may receive a sound and can process such a sound into audio data. The processed audio data may be converted, in a call mode, into a format that can be sent to a mobile communication base station by using the radio frequency unit 501 for output.

The terminal 500 further includes at least one sensor 505, for example, a light sensor, a motion sensor, and another sensor. For example, the light sensor includes an ambient light sensor and a proximity sensor, where the ambient light sensor can adjust brightness of a display panel 5061 based on brightness of ambient light, and the proximity sensor can turn off the display panel 5061 and/or backlight when the terminal 500 is moved towards the ear. As a type of motion sensor, an accelerometer sensor can detect magnitudes of accelerations in all directions (usually three axes), can detect a magnitude and a direction of gravity in a static state, and can be applied to terminal posture recognition (such as screen switching between portrait and landscape, related games, and magnetometer posture calibration), functions related to vibration recognition (such as pedometer and tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by a user or information provided for the user. The display unit 506 may include the display panel 5061, and the display panel 5061 may be configured in a form of a liquid crystal display (LCD), an organic light-emitting diode (OLED), or the like.

The user input unit 507 may be configured to: receive input digit or character information, and generate key signal input related to user setting and function control of the terminal. For example, the user input unit 507 includes a touch panel 5071 and another input device 5072. The touch panel 5071, also referred to as a touchscreen, can collect a touch operation of a user on or near the touch panel 5071 (for example, an operation performed by the user with any suitable object or accessory such as a finger or a stylus on or near the touch panel 5071). The touch panel 5071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented in a plurality of types such as a resistive type, a capacitive type, an infrared ray, and a surface acoustic wave. In addition to the touch panel 5071, the user input unit 507 may further include another input device 5072. For example, the another input device 5072 may include but is not limited to a physical keyboard, function keys (for example, a volume control key and an on/off key), a trackball, a computer mouse, and a joystick. Details are not described herein.

Optionally, the touch panel 5071 may cover the display panel 5061. When detecting a touch operation on or near the touch panel 5071, the touch panel 5071 transmits the touch operation to the processor 510 to determine a type of the touch event, and then the processor 510 provides corresponding visual output on the display panel 5061 based on the type of the touch event. Although in FIG. 5, the touch panel 5071 and the display panel 5061 are used as two independent components to implement input and output functions of the terminal, in some embodiments, the touch panel 5071 and the display panel 5061 may be integrated to implement the input and output functions of the terminal. This is not specifically limited herein.

The interface unit 508 is an interface connecting an external apparatus and the terminal 500. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 508 may be configured to: receive input (for example, data information and power) from the external apparatus, and transmit the received input to one or more elements inside the terminal 500; or may be configured to transmit data between the terminal 500 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of a mobile phone. In addition, the memory 509 may include a high-speed random access memory, or may include a nonvolatile memory, for example, at least one disk storage device, a flash memory, or another volatile solid-state storage device.

The processor 510 is a control center of the terminal, and connects various parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. Optionally, the processor 510 may be integrated with an application processor and a modem processor. The application processor mainly processes the operating system, a user interface, an application, and the like. The modem processor mainly processes wireless communication. It can be understood that, alternatively, the modem processor may not be integrated into the processor 510.

The terminal 500 may further include a power supply 511 (for example, a battery) that supplies power to various components. Optionally, the power supply 511 may be logically connected to the processor 510 through a power supply management system, thereby achieving functions of managing charging, discharging, and power consumption through the power supply management system.

In addition, the terminal 500 includes some functional modules not shown. Details are not described herein.

Optionally, an embodiment of the present disclosure further provides a terminal, including a processor, a memory, and a computer program stored in the memory and executable on the processor. When the computer program is executed by the processor, the processes of the receiver control method embodiment are implemented, and same technical effects are achieved. To avoid repetition, details are not provided herein again.

An embodiment of the present disclosure further provides a non-transitory computer-readable storage medium. The non-transitory computer-readable storage medium stores a computer program, and when the computer program is executed by a processor, the processes of the receiver control method embodiment are implemented, and same technical effects are achieved. To avoid repetition, details are not provided herein again. The non-transitory computer-readable storage medium includes a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by the words "including a . . . " does not exclude another same element in a process, method, article, or apparatus that includes the element.

According to the foregoing descriptions of the implementations, a person skilled in the art may clearly understand that the foregoing method in the embodiments may be implemented by software plus a required universal hardware platform, or clearly may alternatively be implemented by hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings. However, the present disclosure is not limited to the foregoing specific implementations. The foregoing specific implementations are merely exemplary, but are not limitative. Under the enlightenment of the present disclosure, a person of ordinary skill in the art may make many forms without departing from the objective and scope of the claims of the present disclosure, and all of which fall within the protection of the present disclosure.

What is claimed is:

1. A receiver control method, applied to a terminal and comprising:
   when a receiver of the terminal is at a first position of the terminal, picking up, by using a microphone, an audio signal sent by the receiver, wherein when the receiver is at the first position, an orthographic projection of a first sound hole of the receiver along a first direction at least partially overlaps with a target component; and
   if there is a noise in the audio signal picked up by the microphone, moving the receiver to a second position of the terminal, wherein when the receiver is at the second position, the orthographic projection of the first sound hole along the first direction does not overlap with the target component; wherein
   after the picking up, by using a microphone, the audio signal sent by the receiver, the method further comprises:
   analyzing a relationship between a signal frequency and a signal amplitude of the audio signal, to determine whether there is a noise in the audio signal picked up by the microphone.

2. The receiver control method according to claim 1, wherein the target component is a second sound hole of the receiver.

3. The receiver control method according to claim 1, wherein the method further comprises:
   when the receiver is at the first position, receiving a first operation of a user on a target button; and
   moving the receiver to the second position in response to the first operation, wherein the first operation comprises any one of following:
   an operation in which the user presses the target button to preset duration;
   an operation in which the user continuously presses the target button to preset a quantity of times; and
   an operation in which the user presses the target button when the terminal is at a full volume.

4. A terminal, comprising a processor, a memory, and a computer program stored in the memory and executable on the processor, wherein the computer program, when executed by the processor, causes the terminal to perform:
   when a receiver of the terminal is at a first position of the terminal, picking up, by using a microphone, an audio signal sent by the receiver, wherein when the receiver is at the first position, an orthographic projection of a first sound hole of the receiver along a first direction at least partially overlaps with a target component; and
   if there is a noise in the audio signal picked up by the microphone, moving the receiver to a second position of the terminal, wherein when the receiver is at the second position, the orthographic projection of the first sound hole along the first direction does not overlap with the target component; wherein the computer program, when executed by the processor, causes the terminal to further perform:

analyzing a relationship between a signal frequency and a signal amplitude of the audio signal, to determine whether there is a noise in the audio signal picked up by the microphone.

5. The terminal according to claim 4, wherein the target component is a second sound hole of the receiver.

6. The terminal according to claim 4, wherein the computer program, when executed by the processor, causes the terminal to further perform:

when the receiver is at the first position, receiving a first operation of a user on a target button; and moving the receiver to the second position in response to the first operation, wherein the first operation comprises any one of following:

an operation in which the user presses the target button to preset duration;

an operation in which the user continuously presses the target button to preset a quantity of times; and an operation in which the user presses the target button when the terminal is at a full volume.

7. A non-transitory computer-readable storage medium, wherein the non-transitory computer-readable storage medium stores a computer program, and the computer program, when executed by a processor, causes the processor to perform:

when a receiver of a terminal is at a first position of the terminal, picking up, by using a microphone, an audio signal sent by the receiver, wherein when the receiver is at the first position, an orthographic projection of a first sound hole of the receiver along a first direction at least partially overlaps with a target component; and if there is a noise in the audio signal picked up by the microphone, moving the receiver to a second position of the terminal, wherein when the receiver is at the second position, the orthographic projection of the first sound hole along the first direction does not overlap with the target component; wherein the computer program, when executed by the processor, causes the processor to further perform:

analyzing a relationship between a signal frequency and a signal amplitude of the audio signal, to determine whether there is a noise in the audio signal picked up by the microphone.

8. The non-transitory computer-readable storage medium according to claim 7, wherein the target component is a second sound hole of the receiver.

9. The non-transitory computer-readable storage medium according to claim 7, wherein the computer program, when executed by the processor, causes the processor to further perform:

when the receiver is at the first position, receiving a first operation of a user on a target button; and moving the receiver to the second position in response to the first operation, wherein the first operation comprises any one of following:

an operation in which the user presses the target button to preset duration;

an operation in which the user continuously presses the target button to preset a quantity of times; and an operation in which the user presses the target button when the terminal is at a full volume.

* * * * *